United States Patent
Hu et al.

(10) Patent No.: US 8,370,332 B2
(45) Date of Patent: Feb. 5, 2013

(54) BLENDING MOBILE SEARCH RESULTS

(75) Inventors: Ning Hu, Pittsburgh, PA (US); Vida U. Ha, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/008,886

(22) Filed: Jan. 18, 2011

(65) Prior Publication Data

US 2011/0119260 A1  May 19, 2011

Related U.S. Application Data

(63) Continuation of application No. 12/019,486, filed on Jan. 24, 2008, now Pat. No. 7,962,477.

(60) Provisional application No. 60/886,488, filed on Jan. 24, 2007.

(51) Int. Cl.
*G06F 7/00* (2006.01)
(52) U.S. Cl. .................. 707/722; 707/726; 707/748
(58) Field of Classification Search .................. 707/722, 707/726, 748
See application file for complete search history.

(56) References Cited

U.S. PATENT DOCUMENTS

| | | |
|---|---|---|
| 6,601,061 B1 | 7/2003 | Holt et al. |
| 7,130,841 B1 | 10/2006 | Goel et al. |
| 7,451,136 B2 | 11/2008 | Chua et al. |
| 7,962,477 B2 | 6/2011 | Hu et al. |
| 2002/0143890 A1 | 10/2002 | Naqvi |
| 2002/0198869 A1 | 12/2002 | Barnett |
| 2005/0060297 A1 | 3/2005 | Najork |
| 2006/0123042 A1 | 6/2006 | Xie et al. |
| 2006/0143197 A1 | 6/2006 | Kaul et al. |
| 2006/0212451 A1 | 9/2006 | Serdy, Jr. et al. |
| 2006/0224554 A1 | 10/2006 | Bailey et al. |
| 2006/0242129 A1 | 10/2006 | Libes et al. |
| 2006/0248062 A1 | 11/2006 | Libes et al. |
| 2007/0050338 A1 | 3/2007 | Strohm et al. |
| 2011/0213722 A1 | 9/2011 | Hu et al. |
| 2011/0231423 A1 | 9/2011 | Lopiano |

OTHER PUBLICATIONS

Nadamoto, A., et al., "WebCarousel: Automatic Presentation and Semantic Restructuring of Web Search Result for Mobile Environments," H.C. Mayr et al. (Eds.): DEXA 2001, LNCS 2001, pp. 712-722, 2001.
Rasolofo, Y., et al., "Result merging strategies for a current news metasearcher," Information Processing & Management, vol. 39, No. 4, Jul. 1, 2003, 29 pages.
International Search Report and Written Opinion of the International Searching Authority, PCT Application Serial No. PCT/US2008/051960, Jun. 2, 2008, 14 pages.
International Preliminary Report on Patentability, PCT Application Serial No. PCT/US2008/051960, Jul. 28, 2009, 8 pages.
Chinese Office Action dated Sep. 26, 2011 for Application No. 200880008734.7, 10 pages.
International Preliminary Report on Patentability, PCT Application Serial No. PCT/US2008/051960, Aug. 6, 2009, 8 pages.

*Primary Examiner* — Cheyne Ly
(74) *Attorney, Agent, or Firm* — Fish & Richardson P.C.

(57) ABSTRACT

Methods, systems, and apparatus, including computer program products, for blending mobile search results. A method includes receiving a search query and multiple search results. The search results each satisfy the search query and have a respective search result quality score. The search results include generic and mobile search results. The generic and mobile search results each identify a generic and mobile resource, respectively. The search result quality scores include mobile and generic search result quality scores for the mobile and generic search results, respectively. The mobile search result quality scores and the generic search result quality scores were generated according to different scoring formulas. Based on one or more terms in the search query, the search query is classified as a mobile query. As a consequence, one or more search result quality scores are modified to improve the sorting of search results that include both mobile and generic search results.

24 Claims, 4 Drawing Sheets

BLENDING MOBILE SEARCH RESULTS

CROSS-REFERENCE TO RELATED APPLICATION

This application claims priority to U.S. patent application Ser. No. 12/019,486 filed Jan. 24, 2008 which claims priority benefit of U.S. Provisional Application Ser. No. 60/886,488 filed on Jan. 24, 2007.

BACKGROUND

This specification relates to the presentation of search results in response to a search request presented by a user to a search service that can provide both generic search results and mobile-friendly search results.

A search service, e.g., a web-based search service, will generally receive a search request from a user through a search page presented to the user by the service through a web browser on a personal computing device. In making the search request, the user will generally select a kind of resource to be searched—e.g., generic web pages, mobile web pages, and so on—and in the absence of an explicit selection, a default selection, typically generic web pages, will be used. Generic web pages are uncategorized web pages, as opposed to, for example, mobile-friendly web pages ("mobile web pages") which are web pages categorized as specifically suitable for or directed to mobile devices. Some search services will present different search pages as user interfaces to receive search requests directed to searching different kinds of resources.

Upon receiving a search query, a search service will generally direct the search query to a search engine for a specific corpus of resources. The search engine associated with a kind of resource will produce search results based on the query and on the kind of resource it is associated with.

After the search engine produces the search results, the search service presents those results to the user.

SUMMARY

This specification describes technologies relating to blending results for a search query that derive from different search engines or bodies of searched resources.

In general, one aspect of the subject matter described in this specification can be embodied in methods that include the actions of receiving a search query and multiple search results. The search results each satisfy the search query and have a respective search result quality score. The search results include generic search results and mobile search results. The generic search results each identify a generic resource. The mobile search results each identify a mobile resource. The search result quality scores include mobile search result quality scores for the mobile search results and generic search result quality scores for the generic search results. The mobile search result quality scores and the generic search result quality scores were generated according to different scoring formulas. Based on one or more terms in the search query, the search query is classified as a mobile query. As a consequence, one or more search result quality scores are modified to improve the sorting of search results that include both mobile search results and generic search results. Other embodiments of this aspect include corresponding systems, apparatus, and computer program products.

These and other embodiments can optionally include one or more of the following features. Modifying the one or more search result quality scores includes modifying one or more mobile search result quality scores to make the modified mobile search result quality scores commensurable to the generic search result quality scores. In some implementations, the mobile search results are derived from a mobile corpus. The mobile corpus is a corpus of resources that are adapted for mobile devices. The generic search results are derived from a generic corpus. The generic corpus is distinct from the mobile corpus. In some implementations, the method identifies a search result as a mobile search result based on one or more properties of the resource identified by the search result. In some implementations, the one or more properties include whether the resource is a wireless markup language document. In some implementations, the multiple generic search results are presented in an order. One or more of the mobile search results are presented inserted at a position between two otherwise adjacent search results in the order. The position is determined by using the search result quality scores of the generic and mobile search results.

In general, another aspect of the subject matter described in this specification can be embodied in methods that include presenting multiple search results. The search results each satisfy a search query and have a respective search result quality score. The search results include a first and second set of search results. The search result quality scores of the first set of search results are calculated based on a first scoring criteria. The search result quality scores of the second set of search results are calculated based on a second scoring criteria. The first and second scoring criteria are distinct. Modifying the search result quality scores of the first set of search results makes the scores commensurable to the search result quality scores of the second set of search results. Other embodiments of this aspect include corresponding systems, apparatus, and computer program products.

In general, another aspect of the subject matter described in this specification can be embodied in methods that include receiving a search query, multiple generic search results, and multiple mobile search results. The generic search results each satisfy the search query, identify a generic resource, and have a respective search result quality score. The mobile search results each satisfy the search query, identify a mobile resource, and have a respective search result quality score. The method determines that the search query came from a mobile user. For each mobile search result, one or more properties of the mobile resources identified by the mobile search results is evaluated. At least one of the mobile search result quality scores is modified based on the one or more properties of the corresponding mobile resources. Other embodiments of this aspect include corresponding systems, apparatus, and computer program products.

These and other embodiments can optionally include one or more of the following features. Modifying the mobile search result quality score includes increasing the mobile search result quality score if the mobile search result links to a mobile resource that links to downloadable content for a mobile device. In some implementations, modifying the mobile search result quality score includes identifying a first language of the search query, identifying that the mobile resource identified by the mobile search result is written in a second language, and decreasing the mobile search result quality score if the first language is different from the second language. In some implementations, the mobile search results and the generic search results are ranked in an order. The ranking is based on the search result quality scores. One or more duplicates from the order are removed. In some implementations, removing the one or more duplicates includes identifying a first mobile search result that identifies a first uniform resource locator and identifying a first generic search result that identifies a second uniform resource locator. The second uniform resource locator is the same as the first uniform resource locator. The first generic search result is removed from the order. If the first generic search result had a higher rank than the first mobile search result, the first mobile search result is moved to the position in the order that the first generic search result occupied. In some implementations, removing the one or more duplicates includes identifying a first mobile search result that identifies a first uniform resource locator, and identifying a first generic search result that identifies a second uniform resource locator. The second uniform resource locator is different from the first uniform resource locator. The respective resources located at the first and second uniform resource locators are different versions of a same web page. The first generic search result is removed from the order. If the first generic search result had a higher rank than the first mobile search result, the first mobile search result is moved to the position in the order that the first generic search result occupied.

In general, another aspect of the subject matter described in this specification can be embodied in methods that include receiving a search query, multiple generic search results, and multiple mobile search results. The generic search results each satisfy the search query, identify a generic resource, and have a respective search result quality score. The mobile search results each satisfy the search query, identify a mobile resource, and have a respective search result quality score. The method determines that the search query came from a mobile user. One or more threshold scores are identified. Each threshold score is based on correlations between evaluation ratings assigned by one or more people to a sample of mobile search results and their respective search result quality scores. Each search result quality score of the mobile search results is modified based on whether it exceeds one or more of the threshold scores to make it commensurate to the search result quality scores of the generic search results. In some implementations, a query length is determined. The query length is the number of terms in the search query. One or more threshold scores is lower for a query with a longer query length than for a query with a shorter query length. In some implementations, the method identifies two threshold scores. The method multiplies a first search result quality score of the mobile search results by a first value where the first search result quality score exceeds only of the identified threshold scores. The method multiplies a second search result quality score of the mobile search results by a second value where the second search result quality score exceeds two of the identified threshold scores. The first and second values are distinct. Other embodiments of this aspect include corresponding systems, apparatus, and computer program products.

In general, another aspect of the subject matter described in this specification can be embodied in methods that include receiving a search query, multiple generic search results, and multiple mobile search results. The generic search results each satisfy the search query, identify a generic resource, and have a respective search result quality score. The mobile search results each satisfy the search query, identify a mobile resource, and have a respective search result quality score. The method determines that the search query came from a mobile user. For each generic search result, one or more properties of the generic resource identified by the generic search result is evaluated to detect similarities with one or more properties of a mobile resource. The method detects a similarity between a property of a first generic resource and a property of a first mobile resource. The first mobile resource is identified by a first mobile search result that has a first mobile search result quality score. The method increases the first mobile search result quality score. Other embodiments of this aspect include corresponding systems, apparatus, and computer program products.

These and other embodiments can optionally include one or more of the following features. The one or more properties of the generic resources identified by the generic search include a domain where the generic resource is located. The method determines that the one or more mobile search results identify a mobile resource located in a first domain. The method determines that a generic search result identifies a generic resource located in the first domain. The mobile search result quality score of the one or more mobile search results is increased.

In general, another aspect of the subject matter described in this specification can be embodied in methods that include receiving a search query, multiple generic search results, and multiple mobile search results. The generic search results each satisfy the search query, identify a generic resource, and have a respective search result quality score. The mobile search results each satisfy the search query, identify a mobile resource, and have a respective search result quality score. The method determines that the search query came from a mobile user. The number of mobile search results are determined. The generic search results are presented. The mobile search results are presented only if the number of mobile search results exceeds a threshold number. Other embodiments of this aspect include corresponding systems, apparatus, and computer program products.

Particular embodiments of the subject matter described in this specification can be implemented to realize one or more of the following advantages. Mobile search results can be returned as a result in response to a search of web pages based on the rank scoring of the mobile results without a need for the user to categorize the search request as one for which mobile search results are sought. This blending provides the most relevant search results to the user.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
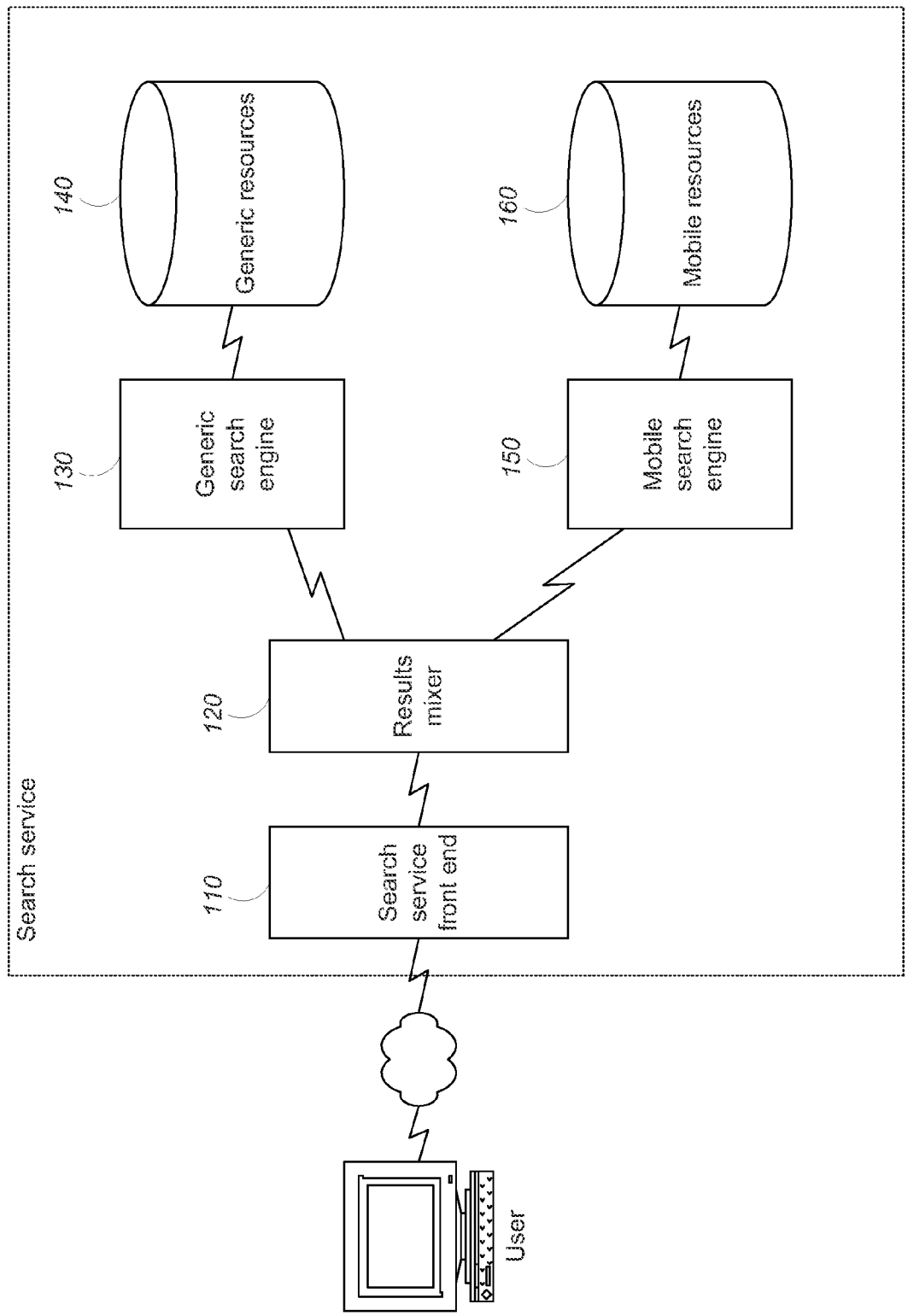
FIG. 1A illustrates an example of a search service.

FIG. 1A illustrates an example search service that has a search service front-end 110, a results mixer 120, a generic search engine 130 for searching generic resources 140, and a mobile search engine 150 for searching mobile resources 160.

Figure 1B:
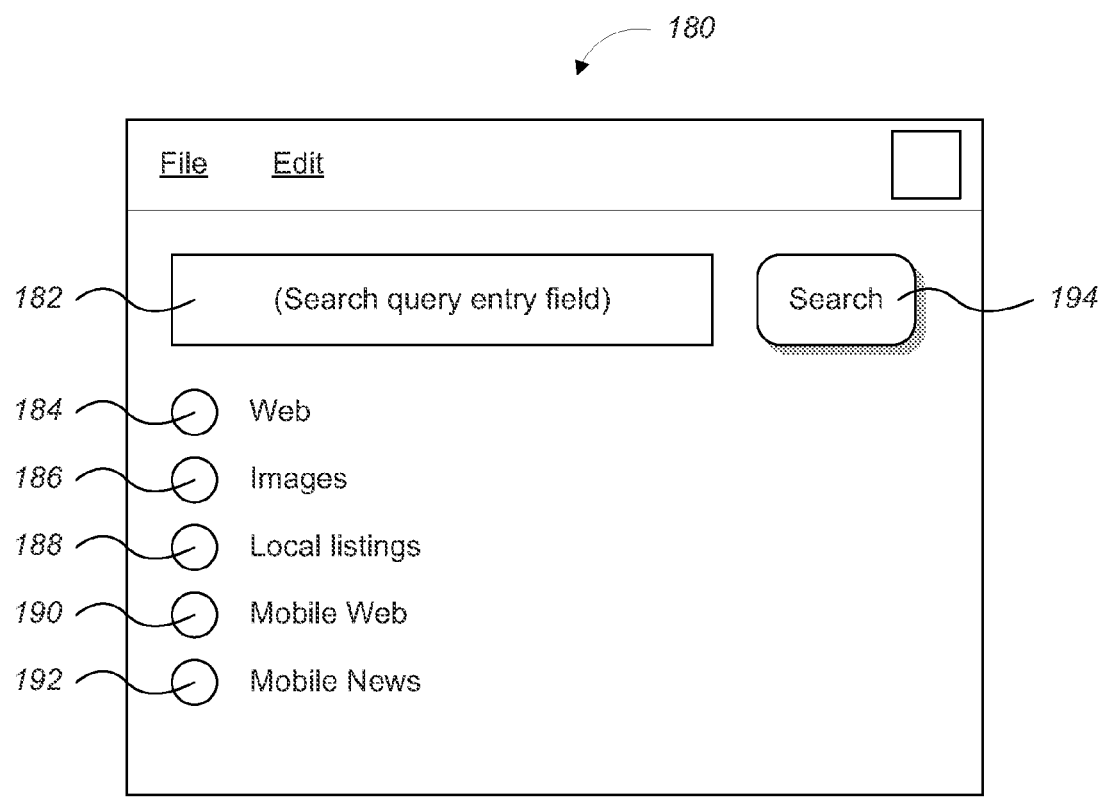
FIG. 1B illustrates an example user interface for a mobile user of the example search service.

FIG. 1B illustrates an example user interface of the example search service presented to a user using a mobile device (a "mobile user"), including, for example, a mobile telephone running a WAP browser. The user interfaces with the search service through a web site 180. The user enters a search query into the search query entry field 182. The user may select one of the following radio buttons, each associated with a type of resource to search: a web radio button 184, an images radio button 186, a local listings radio button 188, a mobile web radio button 190, or a mobile news radio button 192. If no button is selected, a web search is the default selection. After entering the search query, the user clicks on the "search" button 194 to initiate the search based on the entered query and on any selected resource to search. In some implementations, additional or different types of searches can be requested, and multiple types of searches can be requested, for example, with check boxes used instead of radio buttons. In some implementations, a search of mobile resources is the default selection. In some implementations, the user interface does not include radio buttons and does not provide the user with a choice of a type of resource to search; the user submits the search query and receives search results based on the entered query and on multiple resources available to search (e.g., mobile web pages, generic web pages, and so on).

The search service front-end is specifically designed for mobile users to use in requesting search results for their mobile device (e.g., the search service provides results in a format that is user-friendly to mobile devices). The mobile user may want results that identify generic resources, mobile resources (e.g., pages written in the Wireless Markup Language ("WML")), or both. Although the search service is designed for mobile users, it may be used by a non-mobile user using a non-mobile device, e.g., a personal desktop computer.

Each of the resources identified by the search results is derived from a particular corpus. For example, the mobile resources are so called because they are derived from a mobile corpus, and the generic resources are derived from a generic web corpus. The resources accessible on the web are commonly grouped into multiple corpora for indexing and search, and any one resource may be found in one or multiple corpora. In the context of a search engine, a distinct corpus is generally associated with a distinct scoring algorithm, as the factors that are useful for ranking resources will generally differ according to the nature of the resource.

Figure 2:
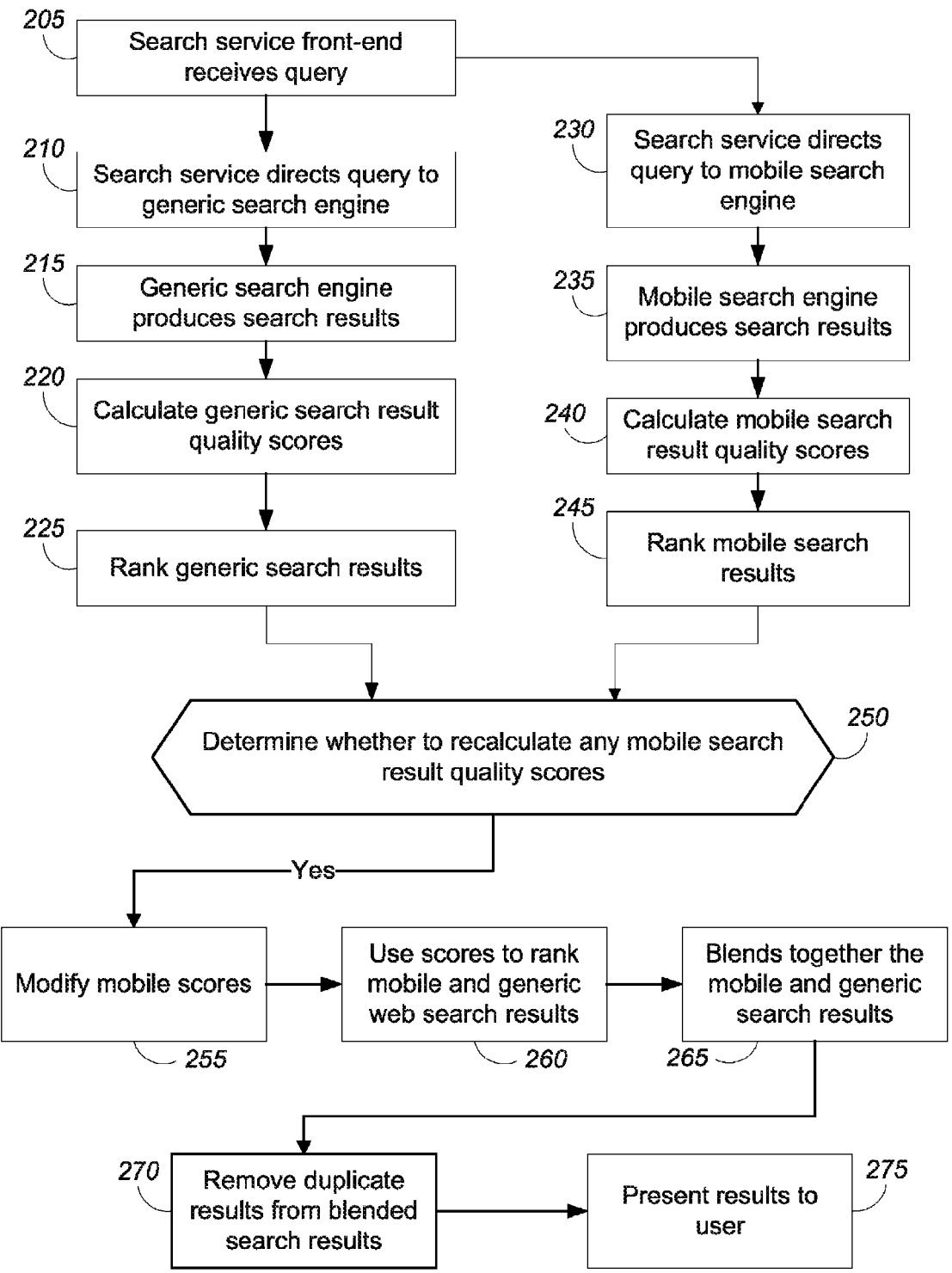
FIG. 2 is a flowchart illustrating operation and use of the example service.

FIG. 2 is a flowchart illustrating operation of the example service and use of the service by a mobile user.

The search service front-end receives the mobile user's query (step 205). The search service generally identifies the user as a mobile user by detecting the source of the query. A mobile user's query will originate from any of a variety of mobile sources, e.g., a mobile device.

In some implementations, the search service front-end provides search results that link to generic web resources in a mobile-friendly way. More particularly, even though a typical web page is generally designed for presentation by a web browser running on a personal computer, when the mobile user accesses the web page through the search result link, the mobile user actually receives the page in a mobile-friendly format, if it is not already in such a format. Rather than getting the web page, clicking on the search result link actually invokes a transcoder that converts the web page and sends the converted page rather than the original page to the user.

A mobile user may want to search both mobile and generic resources, but might either submit a search query without identifying this intent, or erroneously submit a search query requesting a search of only one type of resource. The search service can infer the user's intent and provide the desired search results by directing the user's query to both a generic search engine and a mobile search engine. The mobile search engine can search a number of different kinds of mobile resources, or it can be one or several engines searching specialized resources, e.g., mobile news or mobile shops.

The search service directs the mobile user's query to the generic search engine (step 210). The generic search engine performs the search and produces generic search results (step 215). These results may include resources other than conventional HTML (Hypertext Markup Language) documents, including, for example, PDF (Portable Document Format) documents, word processing documents, slide-based presentation documents, animations, images, audio media files, audiovisual media files, extensible markup language (XML) documents, and pages with server-side scripting.

The generic search engine calculates a search result quality score for each of its search results (step 220). Using the search result quality scores, the generic search engine ranks the generic search results (step 225). In other implementations, the results mixer ranks the generic search results.

The search service also directs the query to the mobile search engine (step 230). The mobile search engine performs the search and produces one or more mobile search results (step 235). As with the generic search results, these results may include resources other than WML documents, including, for example, xHTML (Extensible Hypertext Markup Language) documents, and cHTML (compact Hypertext Markup Language) documents.

The mobile search engine calculates a search result quality score for each of its search results (step 240). To calculate the scores, the mobile search engine uses a different scoring algorithm, or formula, than the one used by the generic search engine. Using the search result quality scores, the mobile search engine ranks the mobile search results (step 245). In other implementations, the results mixer ranks the mobile search results.

The results mixer blends together the mobile and generic search results so that the user receives a single composite presentation of search results in response to the search query.

Figure 3:
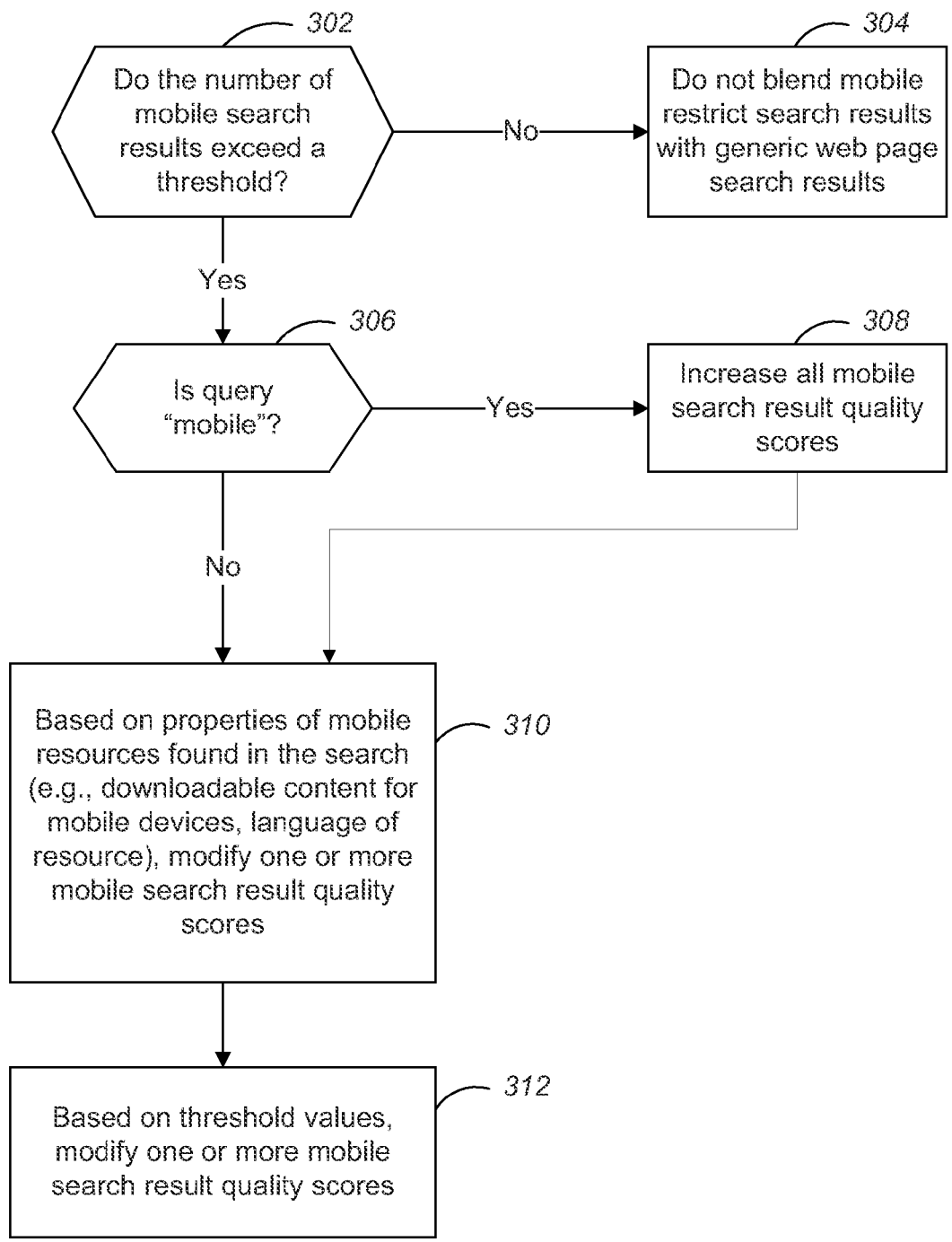
FIG. 3 is a flowchart illustrating processes for modifying mobile search result scores.

As illustrated in FIG. 3, in some implementations, the results mixer first determines whether to present any mobile search results. It may do this, for example, by determining whether the number of mobile search results produced by the search query is greater than a threshold number (step 302). If the number of mobile search results is too small, then the results mixer concludes that none of the results are sufficiently relevant to the user's search query. When this approach is used, the results mixer will only present the mobile search results when the number of mobile search results is large enough (step 304).

The threshold number may be either an absolute number or a percentage. For example, the percentage could represent the percent of mobile search results received by the results mixer out of the combined number of mobile and generic search results received.

The results mixer determines whether to modify the mobile search result quality scores (step 250). Depending on its determination, the results mixer will or will not modify the mobile search result quality scores (step 255). Modifying the scores may be necessary to make the mobile search result quality scores commensurable to the generic search result quality scores, or otherwise to improve the usefulness of the presentation of blended search results.

The determination can be made using one or more signals, including whether the query is a "mobile" query, whether the search results exceed threshold scores, the number of mobile search results, the properties of the mobile resources found in the search, or the properties of the generic resources found in the search. In some implementations, when the results mixer uses more than one signal, it will use the signals and modify the mobile search result quality scores in a non-linear manner.

In some implementations, based on one or more terms in the search query, the results mixer classifies the search query as "mobile," i.e., whether it is likely to be intended as a search for mobile resources, e.g., pages (step 306). If so, the results mixer will increase the search result quality scores of the mobile search results (step 308). For example, if a search query includes the term "ringtones", the results mixer can determine that such a query is likely to be intended as a search for mobile resources, because the word "ringtones" is closely associated with mobile devices. In such a case, the results mixer will increase the mobile search result quality scores. It may do this, for example, by multiplying all the mobile search result quality scores by a number greater than one. In addition or as an alternative, in some implementations, if the search query is determined likely not intended as a search for mobile resources, the results mixer will decrease the mobile search result quality scores.

To classify the search query as "mobile," the results mixer in some implementations uses a query classifier. In some implementations, the classifier uses separate search logs that have respectively collected queries directed specifically to searching generic resources and queries directed specifically to searching mobile resources. The search logs contain queries, and may also contain search results associated with the respective queries. Using statistical analysis on the search logs, the query classifier determines what queries are "mobile" queries, i.e., what queries have been typically directed to searching mobile resources. Based on that determination, the query classifier can classify a given search query as mobile or not.

The query classifier can be implemented as a naïve Bayes classifier. The query classifier is configured using multiple statistical features from the search logs, e.g., n-grams and frequency histograms of basic units of queries (e.g., words and phrases plotted against the number of appearances in search queries). Alternatively, the query classifier can be implemented using a Machine Learning model different from the naëve Bayes classifier. The query classifier can utilize natural language processing techniques to help process the search logs, including segmentation, stemming, and so on.

In some implementations, to determine whether to modify the mobile search result quality scores, the results mixer uses properties of the resources identified by the mobile search results, either alone or in addition to other factors that have been described (step 310).

For example, for each mobile search result that links to a web page that links to downloadable content for a mobile device, the results mixer can increase the corresponding search result quality score. One reason for increasing the score is that mobile search results identifying web pages associated with downloadable content for a mobile device are generally considered high-quality results for a mobile device or mobile user.

As another example, the results mixer can use the language that the query was written in (the "query language") to determine whether to modify any mobile search result quality scores. To determine the language of the query, the results mixer can use any of the methods described in U.S. Patent Application No. 60/793,677, entitled Query Language Identification, which is incorporated by reference in its entirety. The results mixer compares the language of the query to the language of each mobile resource identified by a mobile search result. The results mixer can modify each search result quality score based on the comparison, increasing the scores of same-language results and decreasing the scores of different-language results, either uniformly or based on the specific language pair of each result.

In some implementations, the results mixer can decrease the search result quality scores of all the mobile search results when there are too few mobile search results. One reason for doing so is that mobile search results are not likely to be relevant if there are only a few of them.

In some implementations, to determine whether to modify the mobile search result quality scores, the results mixer uses the properties of the resources identified by the generic search results, either alone or in addition to other factors that have been described. For example, if both a generic search result and a mobile search result each identify a resource located in the same domain (e.g., "cnn.com"), the results mixer will increase the score of the mobile search result. One reason for doing so is that the mobile search result is more likely to be relevant to the query if it identifies a resource that shares the same domain as a resource identified by a generic search result.

In some implementations, the results mixer uses one or more threshold scores to decide how to modify each mobile search result quality score (step 312). For example, when two threshold scores are used, the results mixer will multiply by one value those mobile search result quality scores that exceed only one threshold score, and will multiply by a different value those mobile search result quality scores that exceed two threshold scores. By applying different multipliers to scores that exceed different thresholds, the results mixer can transform the mobile search result quality scores into a score that is more comparable to the generic search result quality scores. Alternatively, the results mixer may perform other mathematical transformations different from mere multiplication, and the results mixer may use a different number of threshold scores.

For example, mobile search result quality scores can range from 1 to 100, while generic search result quality scores can range from 1000 to 5000. In this example, assume there is no linear correlation between the range of mobile and generic search result quality scores. More specifically, a mobile score of 50 is not comparable to a generic score of 3000. The results mixer will use threshold values to distinguish between sub-ranges of mobile scores (e.g., thresholds of 20 and 80 are associated with sub-ranges of 1-20, 21-80, and 81-100) and to distinguish between sub-ranges of generic scores (e.g., thresholds of 3000 and 4500 are associated with sub-ranges of 1000-3000, 3001-4500, and 4501-5000). Furthermore, for reasons explained below, each sub-range of mobile scores is associated with one sub-range of generic scores. The results mixer modifies mobile scores that are within one sub-range so that the modified mobile scores fall within the sub-range of the generic scores that is associated with the sub-range of the mobile scores.

To associate sub-ranges of mobile scores with sub-ranges of generic scores, a system uses evaluation ratings. An evaluation rating is a rating assigned by people who individually rate sample results according to a rating scale (e.g., "exact match", "useful", "not relevant"). The sample results may identify web pages that have been converted into a mobile-friendly format by a transcoder. The system receives the sample results after directing sample queries to a search engine. The sample queries belong to one of a possible number of sample query sets, with each query set being associated with one of several different categories (e.g., "Navigational", "Downloadable", "Informational", "Topical", etc.). The system creates sample query sets for the mobile search engine, for the generic search engine, and in some cases, for both a mobile and a generic search engine.

The system associates a range of mobile scores that receive one evaluation rating with a range of generic scores that receive the same evaluation rating (i.e., mobile scores receiving the "useful" rating are associated with generic scores receiving the "useful" rating).

The results mixer uses the threshold scores to determine what sub-range a mobile score belongs to. The system determines what threshold scores the results mixer will use. These threshold scores are determined based on the correlation between the evaluation ratings for the sample results, and the search result quality scores for the sample results. For example, for a score range of 1 to 100, and for a sample query set directed to a mobile search engine, scores falling in a range of 1 to 20 may be correlated with the "not relevant" rating; scores falling in a range of 21 to 80 may be correlated with the "useful" rating; and scores falling in a range of 81-100 may be correlated with the "exact match" rating. Queries with a longer length (e.g., the number of terms in the search query) are typically associated with lower scores, and thus lower threshold scores are typically created for longer queries.

After modifying the mobile search result quality scores, the results mixer uses the scores to rank the mobile and generic search results in a single ranking order (step 260).

Based on these rankings, the results mixer blends the search results together (step 265) so that both can be presented in a single list of search results.

The results mixer also removes duplicate search results (step 270).

Duplicates may arise, for example, because a mobile and a generic search result may identify web pages each located at a distinct uniform resource locator ("URL"), when the two web pages are just different versions of each other. For example, the web page for "BBC" is available as a generic web page at URL "http://www.bbc.co.uk", and as a mobile web page at URL "http://www.bbc.co.uk/mobile". Both web pages reference mostly the same content, but in different formats (i.e., the mobile web page is designed in a mobile-friendly format, whereas the generic web page is not). In other cases, duplicates are in the same format and have essentially the same content.

In each case, the results mixer chooses one of the duplicate search results to present, and removes the other one so that it is not presented to the user. Because the search service is designed for mobile users, the results mixer will choose to keep the mobile search result over the generic search result. If the generic search result had a higher rank than the mobile search result, the results mixer will move the mobile search result to the position in the order that the removed generic search result occupied. In some implementations, the results mixer will associate the mobile search result with the higher search result quality score of either the mobile or generic search result.

The search service front-end presents the blended results to the user (step 275). The ranking determines the order in which the results will be presented.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Also, generic search results may be blended with search results from other search engines instead of or in addition to being blended with mobile search results. Examples include search results from a local listings search engine for searching local listings, an image search engine for searching images, a carrier private content search engine for searching mobile web pages categorized as accessible only to subscribers of certain mobile service plans, a mobile news search engine for searching mobile web pages categorized as news, or a mobile marketplace search engine for searching mobile content to purchase.

Furthermore, mobile search results may be blended with search results from other search engines instead of or in addition to being blended with generic search results. Examples include search results from a local listings search engine for searching local listings, an image search engine for searching images, a carrier private content search engine for searching mobile web pages categorized as accessible only to subscribers of certain mobile service plans, a mobile news search engine for searching mobile web pages categorized as news, or a mobile market place search engine for searching mobile content to purchase.

More than two search engines may be used. In addition to blending results from a mobile search engine and a generic search engine, one or more of the following kinds of search results may be blended: search results from a local listings search engine for searching local listings, an image search engine for searching images, a carrier private content search engine for searching mobile web pages categorized as accessible only to subscribers of certain mobile service plans, a mobile news search engine for searching mobile web pages categorized as news, or a mobile market place search engine for searching mobile content to purchase; these results may be blended with each other or with generic web search results or both.

One search engine may be used, rather than two or more. For example, the single search engine may produce both search results identifying generic web pages and search results identifying mobile-friendly web pages. Accordingly, other embodiments are within the scope of the following claims.

What is claimed is:

1. A method implemented by data processing apparatus, the method comprising:
obtaining search results that each satisfy a search query, the search results including a plurality of generic search results and a plurality of mobile search results, wherein the generic search results each identify a respective generic resource and have a respective search result quality score, and wherein the mobile search results each identify a respective mobile resource; and have a respective search result quality score;
determining that the mobile search results fall into a plurality of non-overlapping mobile score sub-ranges based on the respective search result quality scores of the mobile search results;

determining a corresponding generic score sub-range for one or more of the mobile score sub-ranges wherein the generic score sub-range is different than the mobile score sub-range;

modifying the respective search result quality scores of one or more mobile search results that fall into a mobile score sub-range of the mobile score sub-ranges so that the modified respective search result quality scores fall within the corresponding generic score sub-range;

ranking the search results based at least partly on the respective search result quality scores and the modified respective search result quality scores;

providing the ranked search results to a client device; and wherein obtaining, determining, modifying, ranking, and providing are performed by the data processing apparatus.

2. The method of claim 1 wherein determining the corresponding generic score sub-range for a particular mobile score sub-range comprises determining that ratings assigned to a sample plurality of mobile search results having respective search result quality scores that fall into the particular mobile score sub-range are the same as ratings assigned to a sample of generic search results having respective search result quality scores that fall into the generic score sub-range.

3. The method of claim 2 wherein the ratings are assigned according to a ratings scale.

4. The method of claim 1, further comprising increasing the respective search result quality score of a mobile search result of the plurality of mobile search results that links to downloadable content for a mobile device.

5. The method of claim 1 further comprising increasing the respective search result quality score of a mobile search result of the plurality of mobile search results that is in a same language as the search query.

6. The method of claim 1 further comprising decreasing the respective search result quality score of a mobile search result of the mobile search results that is not in a same language as the search query.

7. The method of claim 1 further comprising increasing the respective search result quality score of a mobile search result of the mobile search results that refers to a same resource as a generic search result of the generic search results.

8. The method of claim 1 further comprising increasing the respective search result quality score of a mobile search result of the mobile search results that refers to a resource in a same domain as a resource of a generic search result of the generic search results.

9. A system comprising:
data processing apparatus programed to perform operations comprising:
obtaining search results that each satisfy a search query, the search results including a plurality of generic search results and a plurality of mobile search results, wherein the generic search results each identify a respective generic resource and have a respective search result quality score, and wherein the mobile search results each identify a respective mobile resource and have a respective search result quality score;

determining that the mobile search results fall into a plurality of non-overlapping mobile score sub-ranges based on the respective search result quality scores of the mobile search results;

determining a corresponding generic score sub-range for one or more of the mobile score sub-ranges wherein the generic score sub-range is different than the mobile score sub-range;

modifying the respective search result quality scores of one or more mobile search results that fall into a mobile score sub-range of the mobile score sub-ranges so that the modified respective search result quality scores fall within the corresponding generic score sub-range;

ranking the search results based at least partly on the respective search result quality scores and the modified respective search result quality scores; and providing the ranked search results to a client device.

10. The system of claim 9 wherein determining the corresponding generic score sub-range for a particular mobile score sub-range comprises determining that ratings assigned to a sample plurality of mobile search results having respective search result quality scores that fall into the particular mobile score sub-range are the same as ratings assigned to a sample of generic search results having respective search result quality scores that fall into the generic score sub-range.

11. The system of claim 10 wherein the ratings are assigned according to a ratings scale.

12. The system of claim 9 wherein the operations further comprise increasing the respective search result quality score of a mobile search result of the plurality of mobile search results that links to downloadable content for a mobile device.

13. The system of claim 9 wherein the operations further comprise increasing the respective search result quality score of a mobile search result of the plurality of mobile search results that is in a same language as the search query.

14. The system of claim 9 wherein the operations further comprise decreasing the respective search result quality score of a mobile search result of the mobile search results that is not in a same language as the search query.

15. The system of claim 9 wherein the operations further comprise increasing the respective search result quality score of a mobile search result of the mobile search results that refers to a same resource as a generic search result of the generic search results.

16. The system of claim 9 wherein the operations further comprise increasing the respective search result quality score of a mobile search result of the mobile search results that refers to a resource in a same domain as a resource of a generic search result of the generic search results.

17. A storage medium having instruction stored thereon that, when executed by data processing apparatus, cause the data processing apparatus to perform operations comprising:
obtaining search results that each satisfy a search query, the search results including a plurality of generic search results and a plurality of mobile search results, wherein the generic search results each identify a respective generic resource and have a respective search result quality score, and wherein the mobile search results each identify a respective mobile resource and have a respective search result quality score;

determining that the mobile search results fall into a plurality of non-overlapping mobile score sub-ranges based on the respective search result quality scores of the mobile search results;

determining a corresponding generic score sub-range for one or more of the mobile score sub-ranges wherein the generic score sub-range is different than the mobile score sub-range;

modifying the respective search result quality scores of one or more mobile search results that fall into a mobile score sub-range of the mobile score sub-ranges so that the modified respective search result quality scores fall within the corresponding generic score sub-range;

ranking the search results based at least partly on the respective search result quality scores and the modified respective search result quality scores; and providing the ranked search results to a client device.

18. The storage medium of claim 17 wherein determining the corresponding generic score sub-range for a particular mobile score sub-range comprises determining that ratings assigned to a sample plurality of mobile search results having respective search result quality scores that fall into the particular mobile score sub-range are the same as ratings assigned to a sample of generic search results having respective search result quality scores that fall into the generic score sub-range.

19. The storage medium of claim 18 wherein the ratings are assigned according to a ratings scale.

20. The storage medium of claim 17, wherein the operations further comprise increasing the respective search result quality score of a mobile search result of the plurality of mobile search results that links to downloadable content for a mobile device.

21. The storage medium of claim 17 wherein the operations further comprise increasing the respective search result quality score of a mobile search result of the plurality of mobile search results that is in a same language as the search query.

22. The storage medium of claim 17 wherein the operations further comprise decreasing the respective search result quality score of a mobile search result of the mobile search results that is not in a same language as the search query.

23. The storage medium of claim 17 wherein the operations further comprise increasing the respective search result quality score of a mobile search result of the mobile search results that refers to a same resource as a generic search result of the generic search results.

24. The storage medium of claim 17 wherein the operations further comprise increasing the respective search result quality score of a mobile search result of the mobile search results that refers to a resource in a same domain as a resource of a generic search result of the generic search results.

* * * * *

UNITED STATES PATENT AND TRADEMARK OFFICE
CERTIFICATE OF CORRECTION

PATENT NO. : 8,370,332 B2
APPLICATION NO. : 13/008886
DATED : February 5, 2013
INVENTOR(S) : Ning Hu and Vida U. Ha It is certified that error appears in the above-identified patent and that said Letters Patent is hereby corrected as shown below:

Title Page, References Cited, Column 2, Line 4 – delete "2011/0213722" and insert -- 2011/0213772 --, therefore Title Page, Other Publications, Column 2, Line 6 – delete "metasearcher," and insert -- metasearch," --, therefore In the Claims:

Claim 1, Column 12, Line 62 – delete "resource;" and insert -- resource --, therefore Claim 17, Column 14, Line 46 – delete "storage" and insert -- non-transitory storage --, therefore Claim 18, Column 15, Line 7 – delete "storage" and insert -- non-transitory storage --, therefore Claim 19, Column 15, Line 15 – delete "storage" and insert -- non-transitory storage --, therefore Claim 20, Column 15, Line 17 – delete "storage" and insert -- non-transitory storage --, therefore Claim 21, Column 16, Line 1 – delete "storage" and insert -- non-transitory storage --, therefore Claim 22, Column 16, Line 5 – delete "storage" and insert -- non-transitory storage --, therefore Claim 23, Column 16, Line 9 – delete "storage" and insert -- non-transitory storage --, therefore Claim 24, Column 16, Line 14 – delete "storage" and insert -- non-transitory storage --, therefore Signed and Sealed this
Seventh Day of May, 2013

Teresa Stanek Rea
*Acting Director of the United States Patent and Trademark Office*